(12) United States Patent
Melhuish et al.

(10) Patent No.: US 9,081,611 B1
(45) Date of Patent: Jul. 14, 2015

(54) SYSTEM FOR ITERATIVELY IDENTIFYING AVAILABLE NEXT HIGHER PRIORITY TRACKS WHEN IDENTIFIED TRACK MATCHING THE TASK'S NATIVE TRACK PRIORITY IS UNAVAILABLE

(75) Inventors: Sydney Benjamin Melhuish, Shoreline, WA (US); Ethan Joseph Torretta, Edmonds, WA (US)

(73) Assignee: EMC CORPORATION, Hopkinton, MA (US)

( * ) Notice: Subject to any disclaimer, the term of this patent is extended or adjusted under 35 U.S.C. 154(b) by 205 days.

(21) Appl. No.: 13/478,969

(22) Filed: May 23, 2012

(51) Int. Cl.
*G06F 15/82* (2006.01)
*G06F 11/34* (2006.01)
*G06F 15/80* (2006.01)
*G06F 9/46* (2006.01)
*G06F 9/48* (2006.01)

(52) U.S. Cl.
CPC ............ *G06F 9/4881* (2013.01); *G06F 9/4843* (2013.01)

(58) Field of Classification Search
None
See application file for complete search history.

(56) References Cited

U.S. PATENT DOCUMENTS 7,769,612 B1 * 8/2010 Walker et al. ................ 705/7.11
2003/0033345 A1 * 2/2003 Keefer et al. ................. 709/102

* cited by examiner

*Primary Examiner* — Meng An
*Assistant Examiner* — Dar-Eaum Nam
(74) *Attorney, Agent, or Firm* — Sean M. Evans; Jason A. Reyes; Krishnendu Gupta

(57) ABSTRACT

Embodiments are directed towards coordinating parallel execution of tasks. An ordered priority for each of a plurality of tracks may be established. Furthermore, each of a plurality of tasks may be assigned a native priority. A track for executing a task may be identified based on a match of the task native priority and a track priority. The task can execute at the identified track if the track is available. If the identified track is not available, then another track with a next higher priority than the previously identified track maybe iteratively identified. Next higher priority tracks may be iteratively identified until an available track is identified. If an available track is identified then the task can execute at the available track; otherwise, the task may be put into a wait mode before re-attempt to execute at the track with a priority that matches the task native priority.

18 Claims, 9 Drawing Sheets

US 9,081,611 B1

SYSTEM FOR ITERATIVELY IDENTIFYING AVAILABLE NEXT HIGHER PRIORITY TRACKS WHEN IDENTIFIED TRACK MATCHING THE TASK'S NATIVE TRACK PRIORITY IS UNAVAILABLE

TECHNICAL FIELD

The present invention relates generally to task coordination and, more particularly, but not exclusively to coordinating parallel execution of tasks based on a priority of each task, such that higher priority tasks execute promptly while lower priority tasks are not starved of system resources.

BACKGROUND

Today, many computing tasks are performed across distributed computing environments. Typically these environments include a plurality of nodes that may be performing a number of different tasks. These tasks may include user initiated tasks, system/maintenance tasks, and the like. System/maintenance tasks generally vary in the amount of system resource consumption, system criticality, and the like. In some environments, some tasks may be more critical to the system than other tasks. Typically, more-critical system tasks may be allowed to execute before and/or may be provided more system resources than less-critical system tasks. As a result, the less-critical system tasks may be starved of system resources and/or may not execute at all. However, in some situations, the aggregate of the less-critical system tasks may be highly critical to a system. As a result, if the less-critical system tasks are starved of system resources, then the system may encounter damaging effects. Thus, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

Figure 1:
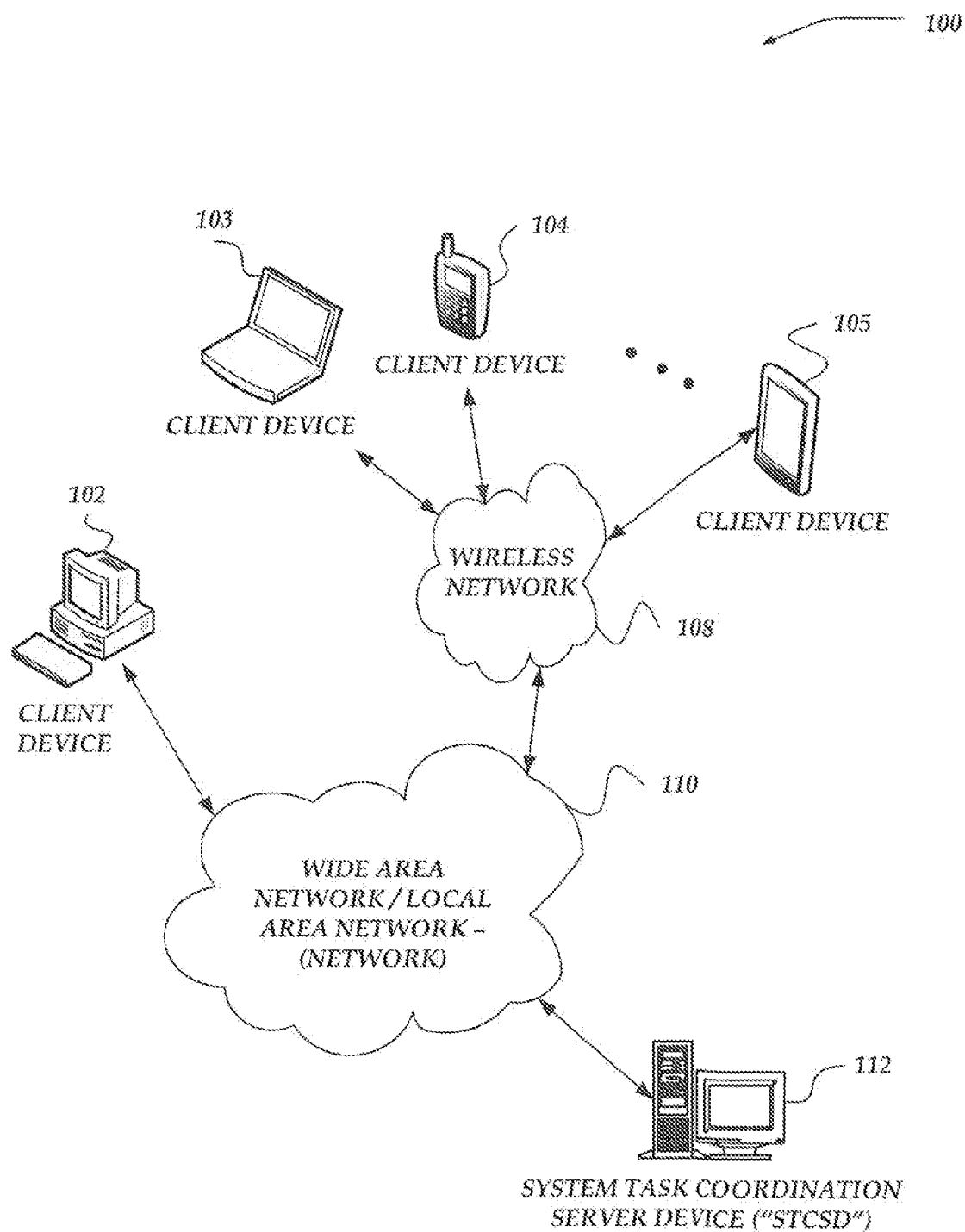
FIG. 1 is a system diagram of an environment in which embodiments of the invention may be implemented.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "node" refers to a physical computing device, including, but not limited to, network devices, servers, processors, cloud architectures, or the like. A node may also include virtual machines, or the like. In at least one of the various embodiments, nodes may be arranged in a cluster interconnected by a high-bandwidth, low latency network backplane. In at least one of the various embodiments, non-resident clients may communicate to the nodes in a cluster through high-latency, relatively low-bandwidth front side network connections, such as Ethernet, or the like.

As used herein, the term "cluster" refers to one or more logically connected nodes. In some embodiments, each node within a cluster may communicate information about nodes within the cluster to other nodes in the cluster. In some other embodiments, a cluster may include a coordinator node to delegate actions between the nodes in the cluster, manage a status of the cluster, or the like.

As used herein, the term "track" refers to a logical construct where a task can execute. In at least one of the various embodiments, each track may correspond to at least one separate resource that is operative to process at least one task. In some embodiments, the at least one separate resource may include, but is not limited to, processor time, memory allocation, and the like. In one embodiment, each node may include a plurality of tracks, where one task at a time can be processed (e.g., execute) at a given track. In another embodiment, a predefined number of tasks (e.g., two or more) can execute at a given track at one time. In some embodiments, each task executing at a track may execute in parallel with other tasks executing at other tracks. In other embodiments, each task executing at a track may receive a separate time slice for execution. In at least one embodiment, the number of tracks may indicate a maximum number of tasks that can execute on a node.

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, embodiments are directed towards coordinating parallel execution of tasks based on a priority of each task and a priority of each of a plurality of tracks. In some embodiments, an ordered priority for each of a plurality of tracks may be established. In one embodiment, each track may have a different priority. In at least one of the various embodiments, each of a plurality of tasks may be assigned a native priority based on a criticality of the task. In one embodiment, the task native priority may include a native track priority that matches a priority of a track. In another embodiment, the task native priority may include a native in-track priority, which may be an ordered priority within a given track.

Briefly, tasks can execute at a track with a priority equal to or higher than the native priority of the task, but the task may not execute at a track with a priority lower than the native priority of the task. In some embodiments, a track for executing a task for a task request may be identified based on a match of a native priority of the task and a track priority. The task can execute at the identified track if the track is available. In one embodiment, the identified track may be available if no task is currently executing at the identified track. In another embodiment, the identified track may be available if a task currently executing at the identified track has a lower native track priority than the task for the request. In yet another embodiment, if the task currently executing at the identified track and the task for the request have a same native track priority, then the identified track may be available if the task currently executing at the identified track has a lower native in-track priority than the task for the request.

If the identified track is not available, then another track with a next higher priority than the previously identified track may be iteratively identified. Next higher priority tracks may be iteratively identified until an available track is identified and/or there are no next higher priority tracks. If an available track is identified then the task can execute at the available track. If no available track is identified with a priority at least as high as the task native priority, then the task may be put into a wait mode. In some embodiments, the task may wait a predetermined time period. In other embodiments, the task may be put into a wait queue. After the wait time period ends and/or the task exits the wait queue, the task may re-attempt to execute at the track with a priority that matches the native priority of the task.

Illustrative Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks ("LANs")/wide area networks ("WANs")—(network) 110, wireless network 108, client devices 102-105, and System Task Coordination Server Device ("STCSD") 112.

At least one embodiment of client devices 102-105 is described in more detail below in conjunction with FIG. 2. In one embodiment, at least some of client devices 102-105 may operate over a wired and/or wireless network, such as networks 110 and/or 108. Generally, client devices 102-105 may include virtually any computing device capable of communicating over a network to send and receive information, perform various online activities, offline actions, or the like. In one embodiment, one or more of client devices 102-105 may be configured to operate within a business or other entity to perform a variety of services for the business or other entity. For example, client devices 102-105 may be configured to operate as a web server, an accounting server, a production server, an inventory server, or the like. However, client devices 102-105 are not constrained to these services and may also be employed, for example, as an end-user computing node, in other embodiments. It should be recognized that more or less client devices may be included within a system such as described herein, and embodiments are therefore not constrained by the number or type of client devices employed.

Devices that may operate as client device 102 may include devices that typically connect using a wired or wireless communications medium such as personal computers, multiprocessor systems, microprocessor-based or programmable electronic devices, network PCs, or the like. In some embodiments, client devices 102-105 may include virtually any portable personal computing device capable of connecting to another computing device and receiving information such as, laptop computer 103, smart mobile telephone 104, and tablet computers 105, and the like. However, portable computing devices are not so limited and may also include other portable devices such as cellular telephones, display pagers, radio frequency ("RF") devices, infrared ("IR") devices, Personal Digital Assistants ("PDAs"), handheld computers, wearable computers, integrated devices combining one or more of the preceding devices, and the like. As such, client devices 102-105 typically range widely in terms of capabilities and features. Moreover, client devices 102-105 may access various computing applications, including a browser, or other web-based application.

A web-enabled client device may include a browser application that is configured to receive and to send web pages, web-based messages, and the like. The browser application may be configured to receive and display graphics, text, multimedia, and the like, employing virtually any web-based language, including a wireless application protocol messages ("WAP"), and the like. In one embodiment, the browser application is enabled to employ Handheld Device Markup Language ("HDML"), Wireless Markup Language ("WML"), WMLScript, JavaScript, Standard Generalized Markup Language ("SGML"), HyperText Markup Language ("HTML"), eXtensible Markup Language ("XML"), and the like, to display and send a message. In one embodiment, a user of the client device may employ the browser application to perform various activities over a network (online). However, another application may also be used to perform various online activities.

Client devices 102-105 also may include at least one other client application that is configured to receive and/or send content between another computing device. The client application may include a capability to send and/or receive content, or the like. The client application may further provide information that identifies itself, including a type, capability, name, and the like. In one embodiment, client devices 102-105 may uniquely identify themselves through any of a variety of mechanisms, including an Internet Protocol ("IP") address, a phone number, Mobile Identification Number ("MIN"), an electronic serial number ("ESN"), or other device identifier. Such information may be provided in a network packet, or the like, sent between other client devices, STCSD 112, or other computing devices.

Client devices 102-105 may further be configured to include a client application that enables an end-user to log into an end-user account that may be managed by another computing device, such as STCSD 112, or the like. Such end-user account, in one non-limiting example, may be configured to enable the end-user to manage one or more online activities, including in one non-limiting example, search activities, social networking activities, browse various websites, communicate with other users, or the like. However, participation in such online activities may also be performed without logging into the end-user account.

Wireless network 108 is configured to couple client devices 103-105 and its components with network 110. Wireless network 108 may include any of a variety of wireless sub-networks that may further overlay stand-alone ad-hoc networks, and the like, to provide an infrastructure-oriented connection for client devices 103-105. Such sub-networks may include mesh networks, Wireless LAN ("WLAN") networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router ("WR") mesh, and the like. Access technologies such as 2G, 3G, 4G, 5G, and future access networks may enable wide area coverage for mobile devices, such as client devices 103-105 with various degrees of mobility. In one non-limiting example, wireless network 108 may enable a radio connection through a radio network access such as Global System for Mobil communication ("GSM"), General Packet Radio Services ("GPRS"), Enhanced Data GSM Environment ("EDGE"), code division multiple access ("CDMA"), time division multiple access ("TDMA"), Wideband Code Division Multiple Access ("WCDMA"), High Speed Downlink Packet Access ("HSDPA"), Long Term Evolution ("LTE"), and the like. In essence, wireless network 108 may include virtually any wireless communication mechanism by which information may travel between client devices 103-105 and another computing device, network, and the like.

Network 110 is configured to couple network devices with other computing devices, including, STCSD 112, client device 102, and client devices 103-105 through wireless network 108.

Network 110 is enabled to employ any form of computer readable media for communicating information from one electronic device to another. Also, network 110 can include the Internet in addition to local area networks ("LANs"), wide area networks ("WANs"), direct connections, such as through a universal serial bus ("USB") port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks ("ISDNs"), Digital Subscriber Lines ("DSLs"), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could .be remotely connected to either LANs or WANs via a modem and temporary telephone link. In one embodiment, network 110 may be configured to transport information of an Internet Protocol ("IP"). In essence, network 110 includes any communication method by which information may travel between computing devices.

Additionally communication media typically embodies computer readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

STCSD 112 includes virtually any network device usable to coordinate parallel execution of tasks based on task native priorities and track priorities. In one embodiment, STCSD 112 may establish an ordered priority of each of a plurality of tracks. In another embodiment, STCSD 112 may assign each of a plurality of tasks a native priority. STCSD 112 may identify a track to execute a task for a task request based on a match of the task native priority and a track priority. If the identified track is available, then STCSD 112 may execute the task at the identified track. Otherwise, STCSD 112 may iteratively identify another track with a next higher priority than the previously identified track until an available track is identified. If an available track is identified then the task can execute at the available track; otherwise, the task may be put into a wait mode before re-attempt to execute at the track with a priority that matches the task native priority. In at least one of the various embodiments, STCSD 112 may be configured to receive data from client devices 102-105. STCSD 112 may employ processes such as described below in conjunction with FIGS. 4-5 to perform at least some of its actions.

Devices that may be arranged to operate as STCSD 112 include various network devices, including, but not limited to personal computers, desktop computers, multiprocessor systems, microprocessor-based or programmable consumer electronics, network PCs, server devices, network appliances, and the like.

Although FIG. 1 illustrates STCSD 112 as a single computing device, the invention is not so limited. For example, one or more functions of the STCSD 112 may be distributed across one or more distinct network devices. In some embodiments, STCSD 112 may include one or more nodes, one or more clusters, and/or a centralized data store.

Moreover, STCSD 112 is not limited to a particular configuration. Thus, in one embodiment, STCSD 112 may contain a plurality of network devices. Similarly, in another embodiment, STCSD 112 may contain a plurality of network devices that operate using a master/slave approach, where one of the plurality of network devices of STCSD 112 operates to manage and/or otherwise coordinate operations of the other network devices. In other embodiments, the STCSD 112 may operate as a plurality of network devices within a cluster architecture, a peer-to-peer architecture, and/or a cloud architecture. Thus, the invention is not to be construed as being limited to a single environment, and other configurations, and architectures are also envisaged.

Illustrative Client Device

Figure 2:
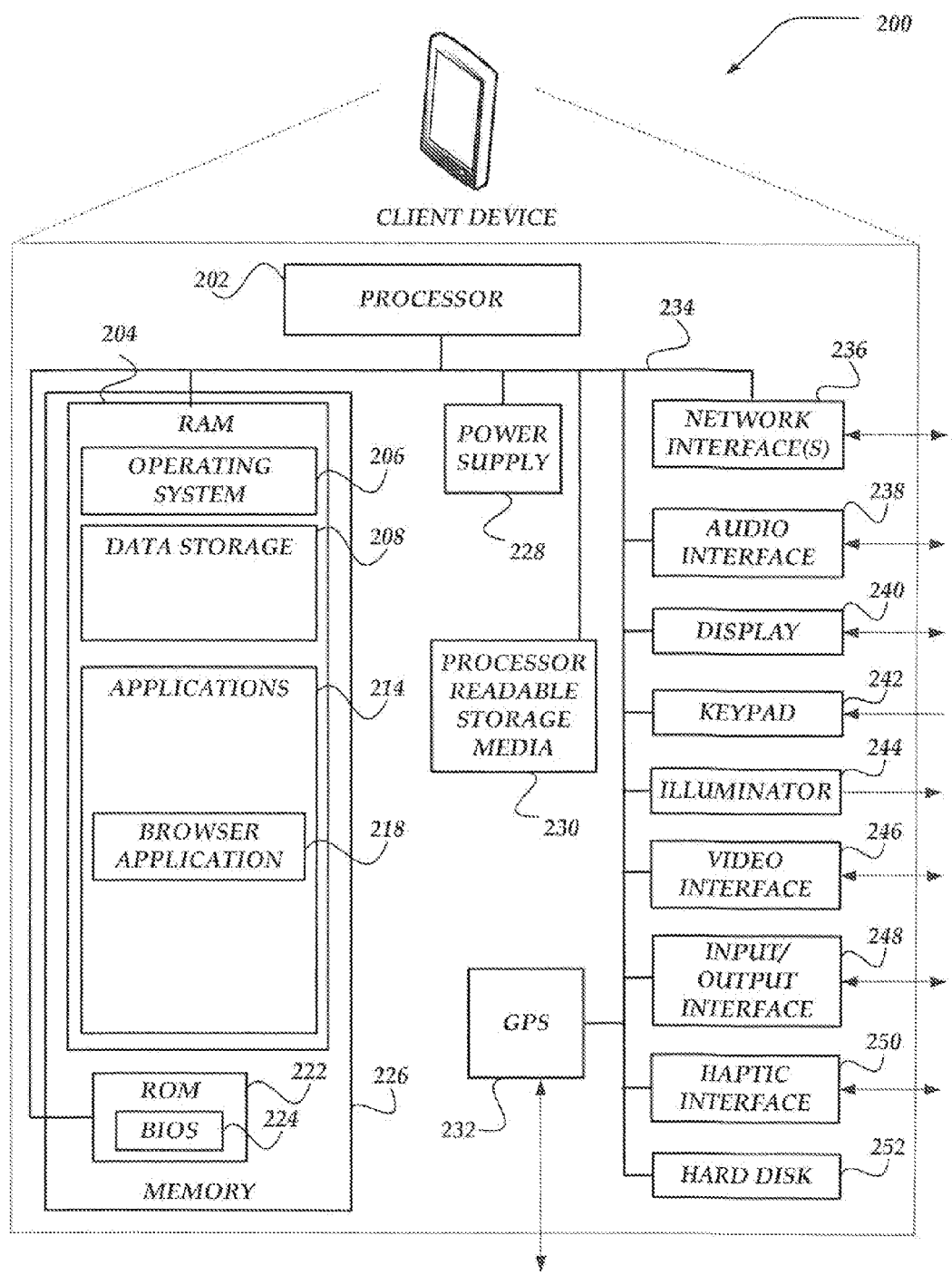
FIG. 2 shows an embodiment of a client device that may be included in a system such as that shown in FIG. 1.

FIG. 2 shows one embodiment of client device 200 that may be included in a system implementing embodiments of the invention. Client device 200 may include many more or less components than those shown in FIG. 2. However, the components shown are sufficient to disclose an illustrative embodiment for practicing the present invention. Client device 200 may represent, for example, one embodiment of at least one of client devices 102-105 of FIG. 1.

As shown in the figure, client device 200 includes a processor 202 in communication with memory 226 via bus 234. In some embodiments, processor 202 may include one or more central processing units ("CPU"). Client device 200 also includes a power supply 228, one or more network interfaces 236, an audio interface 238, a display 240, a keypad 242, an illuminator 244, a video interface 246, an input/output interface 248, a haptic interface 250, and a hard disk 252, and a global positioning system ("GPS") transceiver 232.

Power supply 228 provides power to client device 200. A rechargeable or non-rechargeable battery may be used to provide power. The power may also be provided by an external power source, such as an alternating current ("AC") adapter or a powered docking cradle that supplements and/or recharges a battery.

Client device 200 may optionally communicate with a base station (not shown), or directly with another computing device. Network interface 236 includes circuitry for coupling client device 200 to one or more networks, and is constructed for use with one or more communication protocols and technologies including, but not limited to, GSM, CDMA, TDMA, GPRS, EDGE, WCDMA, HSDPA, LTE, user datagram protocol ("UDP"), transmission control protocol/Internet protocol ("TCP/IP"), short message service ("SMS"), WAP, ultra wide band ("UWB"), IEEE 802.16 Worldwide Interoperability for Microwave Access ("WiMax"), session initiated protocol/real-time transport protocol ("SIP/RTP"), or any of a variety of other wireless communication protocols. Network interface 236 is sometimes known as a transceiver, transceiving device, or network interface card ("NIC").

Audio interface 238 is arranged to produce and receive audio signals such as the sound of a human voice. For example, audio interface 238 may be coupled to a speaker and microphone (not shown) to enable telecommunication with others and/or generate an audio acknowledgement for some action.

Display 240 may be a liquid crystal display ("LCD"), gas plasma, light emitting diode ("LED"), organic LED, or any other type of display used with a computing device. Display 240 may also include a touch sensitive screen arranged to receive input from an object such as a stylus or a digit from a human hand.

Keypad 242 may comprise any input device arranged to receive input from a user. For example, keypad 242 may include a push button numeric dial, or a keyboard. Keypad 242 may also include command buttons that are associated with selecting and sending images.

Illuminator 244 may provide a status indication and/or provide light. Illuminator 244 may remain active for specific periods of time or in response to events. For example, when illuminator 244 is active, it may backlight the buttons on keypad 242 and stay on while the client device is powered. Also, illuminator 244 may backlight these buttons in various patterns when particular actions are performed, such as dialing another client device. Illuminator 244 may also cause light sources positioned within a transparent or translucent case of the client device to illuminate in response to actions.

Video interface 246 is arranged to capture video images, such as a still photo, a video segment, an infrared video, or the like. For example, video interface 246 may be coupled to a digital video camera, a web-camera, or the like. Video interface 246 may comprise a lens, an image sensor, and other electronics. Image sensors may include a complementary metal-oxide-semiconductor ("CMOS") integrated circuit, charge-coupled device ("CCD"), or any other integrated circuit for sensing light.

Client device 200 also comprises input/output interface 248 for communicating with external devices, such as a headset, or other input or output devices not shown in FIG. 2. Input/output interface 248 can utilize one or more communication technologies, such as USB, infrared, Bluetooth™, or the like.

Haptic interface 250 is arranged to provide tactile feedback to a user of the client device. For example, the haptic interface 250 may be employed to vibrate client device 200 in a particular way when another user of a computing device is calling. In some embodiments, haptic interface 250 may be optional.

Client device 200 may also include GPS transceiver 232 to determine the physical coordinates of client device 200 on the surface of the Earth. GPS transceiver 232, in some embodiments, may be optional. GPS transceiver 232 typically outputs a location as latitude and longitude values. However, GPS transceiver 232 can also employ other geo-positioning mechanisms, including, but not limited to, triangulation, assisted GPS ("AGPS"), Enhanced Observed Time Difference ("E-OTD"), Cell Identifier ("CI"), Service Area Identifier ("SAI"), Enhanced Timing Advance ("ETA"), Base Station Subsystem ("BSS"), or the like, to further determine the physical location of client device 200 on the surface of the Earth. It is understood that under different conditions, GPS transceiver 232 can determine a physical location within millimeters for client device 200; and in other cases, the determined physical location may be less precise, such as within a meter or significantly greater distances. In one embodiment, however, mobile device 200 may through other components, provide other information that may be employed to determine a physical location of the device, including for example, a Media Access Control ("MAC") address, IP address, or the like.

Memory 226 includes a Random Access Memory ("RAM") 204, a Read-only Memory ("ROM") 222, and other storage means. Memory 226 illustrates an example of computer readable storage media (devices) for storage of information such as computer readable instructions, data structures, program modules or other data. Memory 226 stores a basic input/output system ("BIOS") 224 for controlling low-level operation of client device 200. The memory also stores an operating system 206 for controlling the operation of client device 200. It will be appreciated that this component may include a general-purpose operating system such as a version of UNIX, or LINUX™, or a specialized client communication operating system such as Microsoft Corporation's Windows Mobile™, Apple Corporation's iOS™, Google Corporation's Android™, or the Symbian® operating system. The operating system may include, or interface with a Java virtual machine module that enables control of hardware components and/or operating system operations via Java application programs.

Memory 226 further includes one or more data storage 208, which can be utilized by client device 200 to store, among other things, applications 214 and/or other data. For example, data storage 208 may also be employed to store information that describes various capabilities of client device 200. The information may then be provided to another device based on any of a variety of events, including being sent as part of a header during a communication, sent upon request, or the like. Data storage 208 may also be employed to store social networking information including address books, buddy lists, aliases, user profile information, or the like. Further, data storage 208 may also store messages, web page content, or any of a variety of user generated content. At least a portion of the information may also be stored on another component of client device 200, including, but not limited to processor readable storage media 230, hard disk 252, or other computer readable storage medias (not Shown) within client device 200.

Processor readable storage media 230 may include volatile, nonvolatile, removable, and non-removable media implemented in any method or technology for storage of information, such as computer- or processor-readable instructions, data structures, program modules, or other data Examples of computer readable storage media include RAM, ROM, Electrically Erasable Programmable Read-only Memory ("EEPROM"), flash memory or other memory technology, Compact Disc Read-only Memory ("CD-ROM"), digital versatile disks ("DVD") or other optical storage, magnetic cassettes, magnetic tape, magnetic disk storage or other magnetic storage devices, or any other physical medium which can be used to store the desired information and which can be accessed by a computing device. Processor readable storage media 230 may also be referred to as computer readable storage device.

Applications 214 may include computer executable instructions which, when executed by client device 200, transmit, receive, and/or otherwise process network data. Examples of application programs include, but are not limited to calendars, search programs, email clients, IM applications, SMS applications, voice over Internet Protocol ("VOIP") applications, contact managers, task managers, transcoders, database programs, word processing programs, security applications, spreadsheet programs, games, search programs, and so forth. Applications 214 may include, for example, browser 218.

Browser 218 may include virtually any application configured to receive and display graphics, text, multimedia, and the like, employing virtually any web based language. In one embodiment, browser 218 may be enabled to employ HDML, WML, WMLScript, JavaScript, SGML, HTML, XML, or the like, to display and send messages. However, any of a variety of other web-based languages may be employed. In one embodiment, browser 218 may enable a user of client device 200 to communicate with another network device, such as STCSD 112 of FIG. 1.

Illustrative Network Device

Figure 3:
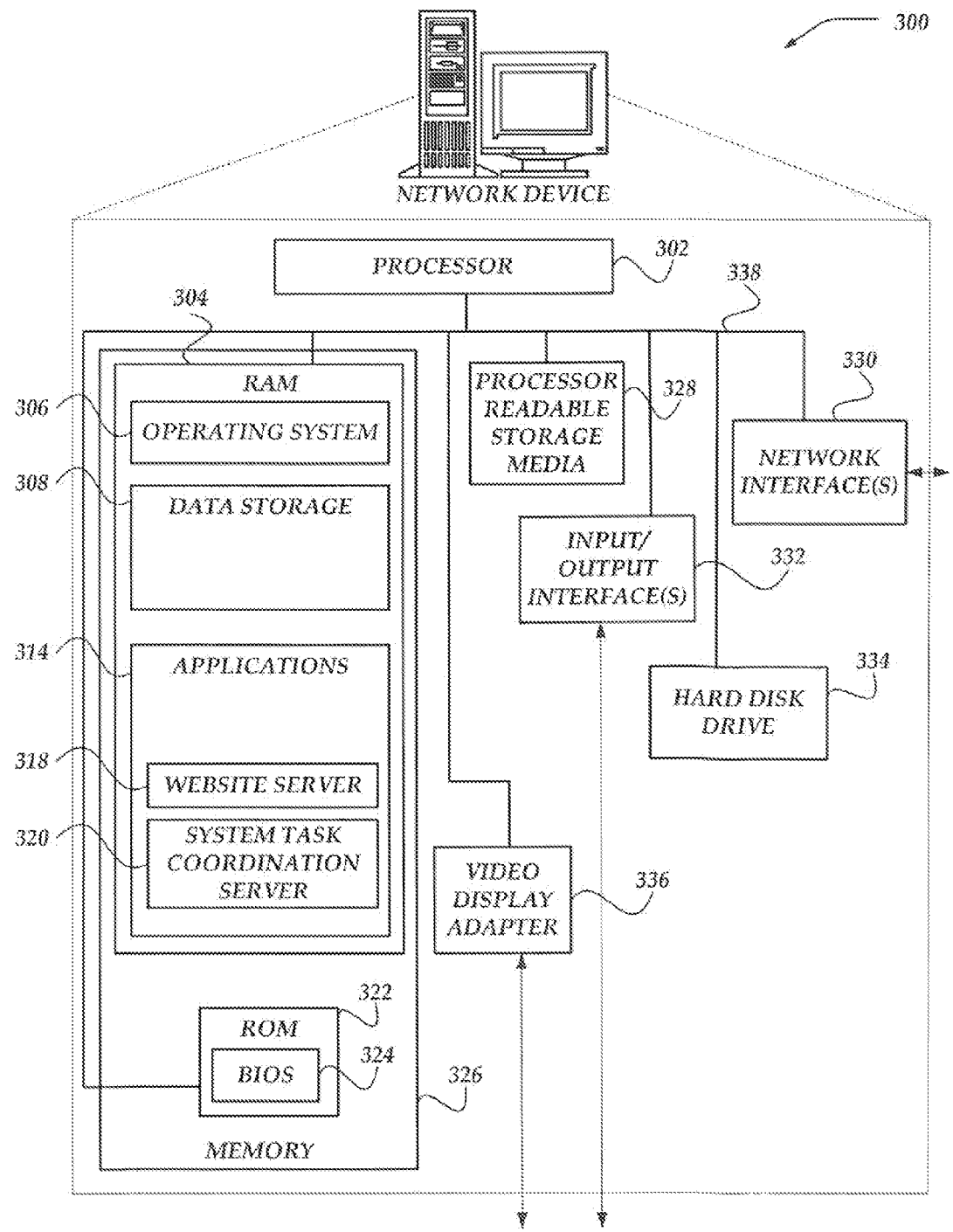
FIG. 3 shows an embodiment of a network device that may be included in a system such as that shown in FIG. 1.

FIG. 3 shows one embodiment of a network device 300, according to one embodiment of the invention. Network device 300 may include many more or less components than those shown. The components shown, however, are sufficient to disclose an illustrative embodiment for practicing the invention. Network device 300 may be configured to operate as a server, client, peer, or any other device. Network device 300 may represent, for example STCSD 112 of FIG. 1. In some embodiments, network device 300 may be configured as one or more nodes in a cluster of nodes.

Network device 300 includes processor 302, processor readable storage media 328, network interface unit 330, an input/output interface 332, hard disk drive 334, video display adapter 336, and memory 326, all in communication with each other via bus 338. In some embodiments, processor 302 may include one or more central processing units.

As illustrated in FIG. 3, network device 300 also can communicate with the Internet, or some other communications network, via network interface unit 330, which is constructed for use with various communication protocols including the TCP/IP protocol. Network interface unit 330 is sometimes known as a transceiver, transceiving device, or network interface card ("NIC").

Network device 300 also comprises input/output interface 332 for communicating with external devices, such as a keyboard, or other input or output devices not shown in FIG. 3. Input/output interface 332 can utilize one or more communication technologies, such as USB, infrared, Bluetooth™, or the like.

Memory 326 generally includes RAM 304, ROM 322 and one or more permanent mass storage devices, such as hard disk drive 334, tape drive, optical drive, and/or floppy disk drive. Memory 326 stores operating system 306 for controlling the operation of network device 300. Any general-purpose operating system may be employed. Basic input/output system ("BIOS") 324 is also provided for controlling the low-level operation of network device 300.

Although illustrated separately, memory 326 may include processor readable storage media 328. Processor readable storage media 328 may be referred to and/or include computer readable media, computer readable storage media, and/or processor readable storage device. Processor readable storage media 328 may include volatile, nonvolatile, removable, and non-removable media implemented in any method or technology for storage of information, such as computer readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by a computing device.

Memory 326 further includes one or more data storage 308, which can be utilized by network device 300 to store, among other things, applications 314 and/or other data. For example, data storage 308 may also be employed to store information that describes various capabilities of network device 300. The information may then be provided to another device based on any of a variety of events, including being sent as part of a header during a communication, sent upon request, or the like. Data storage 308 may also be employed to store messages, web page content, or the like. At least a portion of the information may also be stored on another component of network device 300, including, but not limited to processor readable storage media 328, hard disk drive 334, or other computer readable storage medias (not shown) within client device 300

Data storage 308 may include a database, text, spreadsheet, folder, file, or the like, that may be configured to maintain and store user account identifiers, user profiles, email addresses, IM addresses, and/or other network addresses; or the like. Data storage 308 may further include program code, data, algorithms, and the like, for use by a processor, such as processor 302 to execute and perform actions. In one embodiment, at least some of data store 308 might also be stored on another component of network device 300, including, but not limited to processor-readable storage media 328, hard disk drive 334, or the like.

Applications 314 may include computer executable instructions, which may be loaded into mass memory and run on operating system 306. Examples of application programs may include transcoders, schedulers, calendars, database programs, word processing programs, Hypertext Transfer Protocol ("HTTP") programs, customizable user interface programs, IPSec applications, encryption programs, security programs, SMS message servers, IM message servers, email servers, account managers, and so forth. Website server 318 and Task Management Server ("TMS") 320 may also be included as application programs within applications 314.

Website server 318 may represents any of a variety of information and services that are configured to provide content, including messages, over a network to another computing device. Thus, website server 318 can include, for example, a web server, a File Transfer Protocol ("FTP") server, a database server, a content, server, or the like. Website server 318 may provide the content including messages over the network using any of a variety of formats including, but not limited to WAP, WML, SGML, HTML, XML, Compact HTML ("cHTML"), Extensible HTML ("xHTML"), or the like.

STCS 320 may be configured to manage a plurality of tasks executing on a node. STCS 320 may enable parallel execution of tasks based on task native priorities and track priorities. In one embodiment, STCS 320 may establish an ordered priority of each of a plurality of tracks. In another embodiment, STCS 320 may assign each of a plurality of tasks a native priority. In some embodiments, STCS 320 may generate a task request and/or receive a task request from another computing device, such as client device 200 of FIG. 2 and/or a coordinator node. STCS 320 may identify a track to execute a task for the task request based on a match of a native priority of the task and a track priority. If the identified track is available, then STCS 320 may execute the task at the identified track. Otherwise, STCS 320 may iteratively identify another track with a next higher priority than the previously identified track until an available track is identified. If an available track is identified then STCS 320 may execute the task at the available track; otherwise, the task may be put into a wait mode before re-attempt to execute at the track with a priority that matches the task native priority. In any event, STCS 320 may employ processes, or part of processes, similar to those described below in conjunction with FIGS. 4-5 to perform at least some of its actions.

General Operation

Figure 4:
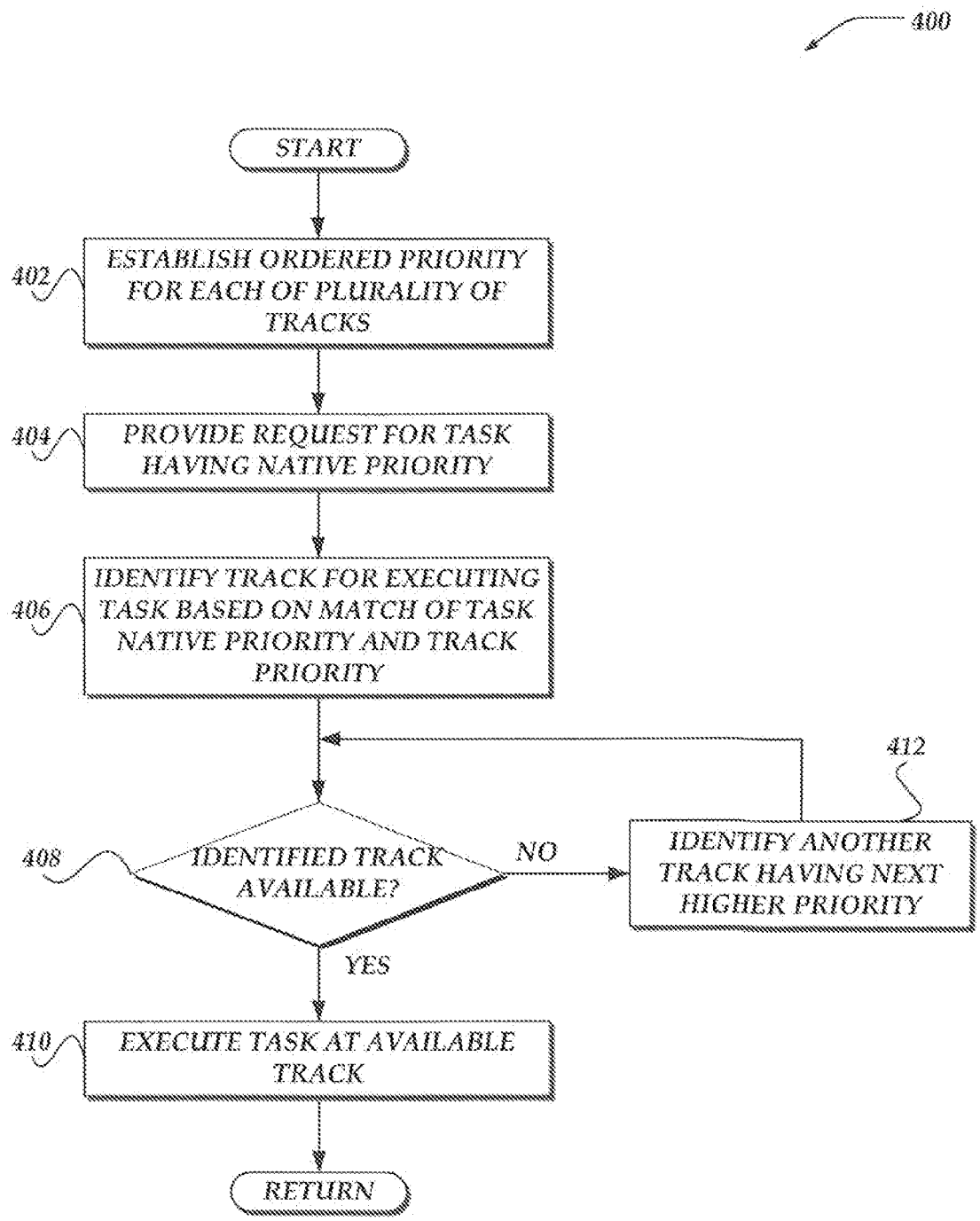
FIG. 4 illustrates a logical flow diagram generally showing one embodiment of an overview process for establishing an ordered priority for each of a plurality of tracks and executing a task at one of the tracks based on a native priority of the task and a priority of available tracks.

The operation of certain aspects of the invention will now be described with respect to FIGS. 4-5. FIG. 4 illustrates a logical flow diagram generally showing one embodiment of an overview process for establishing an ordered priority for each of a plurality of tracks and executing a task at one of the tracks based on a native priority of the task and a priority of available tracks. In some embodiments, process 400 of FIG. 4 may be implemented by and/or executed on a single network device, such as network device 300 of FIG. 3. In other embodiments, process 400 or portions of process 400 of FIG. 4 may be implemented by and/or executed on a plurality of network devices, such as network device 300 of FIG. 3.

In some embodiments, process 400 may be performed by a node among a plurality of nodes. In some embodiments, the plurality of nodes may be in a cluster of nodes. In one embodiment, a node among the plurality of nodes and/or a separate node may be identified as a coordinator node. In some embodiments, the coordinator node may be identified by self election, node voting, a pre-designated coordinator node, or the like. The coordinator node may distribute a plurality of tasks across the plurality of nodes such that at least a portion of each task may operate on one or more nodes.

In at least one embodiment, the plurality of tasks may include, but are not limited to, system tasks, maintenance tasks, or the like. In some embodiments, a task operating on a node may include one or more whole threads and/or fractional threads executing on the node. For example, a node may employ four threads for Task A and one and a half threads for Task B. However, this example is not to be construed as limiting or exhaustive, but rather other numbers of nodes, tasks, tasks per node, and/or threads per task per node may be employed.

In any event, process 400 begins, after a start block, at block 402, where an ordered priority may be established for each of a plurality of tracks. In some embodiments, a different priority may be established for each track. In other embodiments, a same priority may be established for a subset of the plurality of tracks.

In some embodiments, the ordered priority may be from a least critical track to a most critical track. In one embodiment, the least critical track (i.e., low priority track) may be associated with tasks that are individually the least system critical, such as, for example, a recursive delete task. In another embodiment, the most critical track (i.e., high priority track) may be associated with tasks that are individually the most system critical, such as, for example, a parity rebuild task. In one non-limiting, non-exhaustive example, the plurality of tracks may be ordered from track_Zero to track_four, where track_zero has the highest priority (i.e., the most critical track) and track_four has the lowest priority (i.e., the least critical track). However, the invention is not so limited and other numbers of tracks may be employed.

In at least one of the various embodiments, each task among a plurality of tasks may be assigned a native priority. In one embodiment, the native priority of a task may include a native track priority that matches a priority of a track. In some embodiments, one or more tasks may be assigned a same native track priority. In some other embodiments, the native priority of a task may include a native in-track priority. In one embodiment, the in-track priority may be an ordered priority (e.g., from least system critical to most critical) within a given track. For example, Task_A and Task_B may include a same native track priority. However, Task_A may have a higher priority than Task B if Task_A has a native in-track priority that is higher than a native in-track priority of Task_B. In one non-limiting, non-exhaustive example, a task may be identified by the task name, a task native track priority, and a task native in-track priority.

In some embodiments, the native priority of a task may be predetermined based on a criticality of the task. In at least one of the various embodiments, a task may have a native priority higher than another task if the task is more critical than the other task. In one embodiment, the native priority of a task may be configurable and/or modified by a user, administrator, or the like. In some other embodiments, the native priority of a task may be the same across a plurality of nodes that may execute at least a portion of the task.

Process 400 next proceeds to block 404, where a request for a task having a native priority may be provided. In one embodiment, the request may be generated by a node. In another embodiment, the request may be provided by a coordinator node. In some embodiments, the coordinator node may provide the task request to a node based on an impact analysis of tasks executing across a cluster of nodes. In other embodiments, the coordinator node may provide the task request to a node based on a request from a user of a client device, such as client device 200 of FIG. 2. In yet other embodiments, the request may be provided to a node by a client device, such as client device 200 of FIG. 2.

In some embodiments, the task native priority may include a native track priority. In other embodiments, the task native priority may include a native track priority and a native in-track priority.

Process 400 continues at block 406, where a track for executing the task for the request may be identified. In one embodiment, the track may be identified based a correspondence between the native priority of the task and an ordered priority of the track. In at least one embodiment, the track may be identified by match of the task native priority and a track priority. In some embodiments, the track may be identified by comparing the task native priority to each track priority among the plurality of tracks until a match is found between the task native priority and a track priority.

If the task native priority includes a task native track priority and a task native in-track priority, then, in some embodiments, the track may be identified based on a match of the task native track priority and a track priority. In one such embodiment, the track may be identified by comparing the task native track priority to each track priority among the plurality of tracks until a match is found between the task native track priority and a track priority.

In some embodiments, the coordinator node and/or each node among the plurality of nodes may store a mapping between task native priorities (including task native track priorities) and track priorities. In one embodiment, a table may be employed to map task native priorities to track priorities. In other embodiments, each of a plurality of buckets may correspond to a track and may include a list of tasks having a native priority that matches a priority of the corresponding track. However, other methods, data structures, or the like may also be employed to map and/or match task native priorities and track priorities to identify a track for executing the task.

Process 400 next proceeds to decision block 408, where a determination may be made whether the identified track is available. In some embodiments, the identified track may be available if no task is currently executing at the identified track. In other embodiments, the identified track may be available if a current task executing at the identified track has a native priority that is lower than the native priority of the task for the request. In one embodiment, each node may store information identifying each track for the node and whether or not a task is executing at a track on the node. In at least one embodiment, if a task is executing at a track, then the stored information may identify the task and its native priority.

In one embodiment, the identified track may be available if a current task executing at the identified track has a native track priority that is lower than the native track priority of the task for the request. If the current task executing at the identified track and the task for the request have a same native track priority, then, in some embodiments, the identified track may be available if a current task executing at the identified track has a native in-track priority that is lower than the native in-track priority of the task for the request. If the identified track is available, then processing may flow to block 410; otherwise, processing may flow to block 412.

At block 412, another track having a next higher priority may be identified. In some embodiments, the track priority of the identified track (e.g., at block 406) may be utilized to determine a next higher track priority. For example, if the ordered priority of tracks ranges from a low priority of three to a high priority of zero, and if the identified track from block 406 has a priority of three, then the next higher priority may be two. In this non-limiting, non-exhaustive example, the identified other track may be a track with a priority of two.

Process 400 then loops to decision block 408 to determine if the identified other track is available.

However, in some embodiments, there may not be another track having a next higher priority. Continuing the example above, if the identified track has a priority of zero and zero is the highest priority, then there may not be a next higher track priority. In such an embodiment, the task may be put into a wait mode for a predetermined about not time, which is described in more detail below in conjunction with FIG. 5.

If at decision block 408 the identified track is available, then processing may flow to block 410, where the task may be executed at the available track. In some embodiments, the node may store and/or maintain a mapping of tracks and tasks executing at the tracks. In at least one embodiment, the node may create an instance of the task to execute at the available track. In one embodiment, the node may map the task instance to the available track. In at least one of the various embodiments, multiple instances of the task may be created, where each instance maps to a different track. For example, assume Task_A has a native priority of two and that all tracks are currently available. If a request for Task_A is received, then an instance of Task_A may be created and mapped to track_two. If another request for Task_A is received, then, by utilizing embodiments as described above, another instance of Task_A may be created and mapped to track one.

After block 410, process 400 may return to a calling process to perform other actions. In some other embodiments (not shown), process 400 may loop to block 404 to provide another request for a task.

Figure 5:
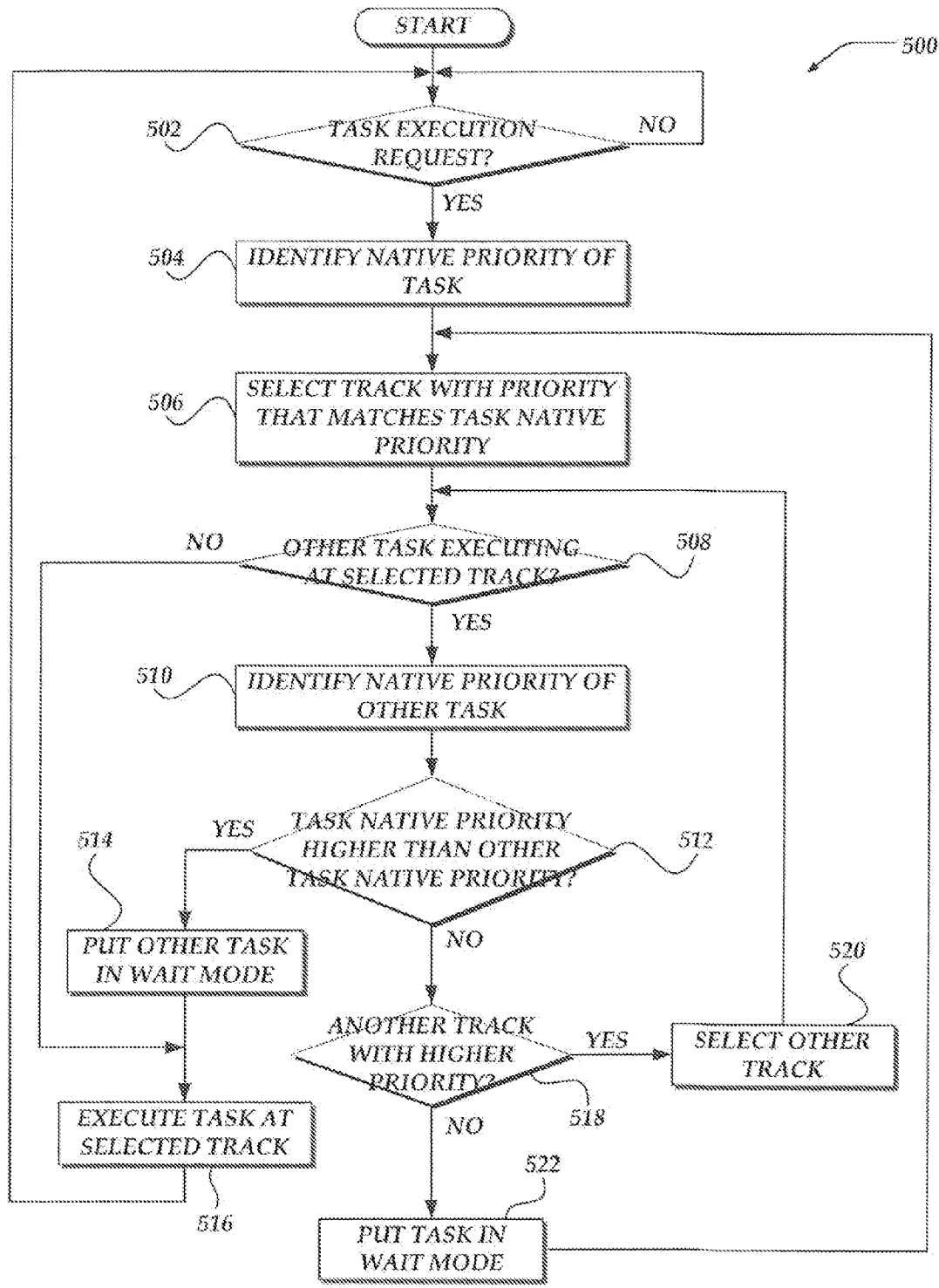
FIG. 5 illustrates a logical flow diagram generally showing one embodiment of a process for executing a task at a track with a priority at least as high as a native priority of the task by iteratively determining if a track with a next higher priority is available.

FIG. 5 illustrates a logical flow diagram generally showing one embodiment of a process for executing a task at a track with a priority at least as high as a native priority of the task by iteratively determining if a track with a next higher priority is available. In some embodiments, process 500 of FIG. 5 may be implemented by and/or executed on a single network device, such as network device 300 of FIG. 3. In other embodiments, process 500 or portions of process 500 of FIG. 5 may be implemented by and/or executed on a plurality of network devices, such as network device 300 of FIG. 3. In one embodiment, process 500 may be performed by a single node among a plurality of nodes.

Process 500 begins, after a start block, at decision block 502, where a determination may be made whether a task execution request has been received. In some embodiments, the task execution request may be generated by a current node executing process 500. In other embodiments, the task execution request may be provided by another node, such as a coordinator node. In yet other embodiments, the task execution request may be provided by a client device, such as client device 200 of FIG. 2. If a task execution request is received, then process 500 may flow to block 504; otherwise, processing loops and waits for a tasks execution request.

At block 504, a native priority of the task may be identified. In one embodiment, the task native priority may include a native track priority and/or a native in-track priority. In some embodiments, the task execution request may include the native priority of the task. In other embodiments, the node may utilize a look-up table to identify the task native priority. However, the invention is not so limited and other methods and/or data structures may be employed to identify the task native priority.

Process 500 continues at block 506, where a track with a priority that matches the task native priority may be selected. In at least one of the various embodiments, block 506 may employ embodiments of block 406 of FIG. 4 to identify and select a track with a priority that matches the task native priority.

Process 500 next proceeds to decision block 508, where a determination may be made whether there is another task executing at the selected track. In some embodiments, information may be stored to identify each track and whether or not a task is executing at a track. In one such embodiment, a table may be maintained by a node to indentify each track and each task currently executing at a respective track on the node. However, the invention is not so limited and other methods may be implemented to determine if another task is executing at the select track. If there is no other task executing at the selected track, then processing may flow to block 516; otherwise, processing may flow to block 510.

At block 516, the task may be executed at the selected track. In at least one embodiment, block 516 may employ embodiments of block 410 of FIG. 4 to execute the task at the selected track. After block 516, process 500 may loop to decision block 502 to wait for another task execution request.

If, at decision block 508, there is another task executing at the selected track, then processing may flow to block 510. At block 510, a native priority of the other task executing at the selected track may be identified. In some embodiments, block 510 may employ embodiments of block 504 to identify the native priority of the other task. In one embodiment, a native track priority of the other task may be identified. In another embodiment, a native in-track priority of the other task maybe identified.

Process 500 continues next at decision block 512, where a determination may be made whether the task native priority is higher than the other task native priority. In some embodiments, a comparison may be performed between the task native priority and the other task native priority to determine if the task native priority is higher than the other task native priority. In one embodiment, the comparison may be between the task native track priority and the other task native track priority. In such an embodiment, the task native priority may be higher than the other task native priority if the task native track priority is higher than the other task native track priority (i.e., the task is more system critical than the other task).

In another embodiment, if the task and the other task have a same native track priority, then the comparison may be between the task native in-track priority and the other task native in-track priority. In such an embodiment, the task native priority may be higher than the other task native priority if the task native in-track priority is higher than the other task native in-track priority.

If the task native priority is higher than the other task native priority, then processing may flow to block 514; Otherwise, processing it may flow to decision block 518.

At block 514, the other task may be put into a wait mode. In some embodiments, block 514 may employ embodiments of block 522 to put the other task in a wait mode. In one embodiment, the wait mode may include a wait time period where the other task may wait a predefined amount of time before attempting to re-execute at a track. In another embodiment, the wait mode may be a queue of tasks waiting to execute. In at least one embodiment, after the time period expires and/or the other task exits the wait queue, processing may loop to block 506 for the other task. In any event, process 500 then flows to block 516 to execute the task at the selected track.

If, at decision block 512, the task native priority is not higher than the other task native priority, then processing may flow to decision block 518. At block 548, a determination may be made whether there is another track with a next higher priority than the priority of the selected track. In some embodiments, if the priority of the selected track is the highest priority of all the tracks, then there may not be another track with a next higher priority. If there is another track with a next higher priority than the priority of the selected track, then processing may flow to block 520; otherwise, processing may flow to block 522.

At block 520, another track with a next higher priority may be selected. In at least one embodiment, block 520 may employ embodiments of block 506 to select the other track by selecting a track with a priority that matches a next higher priority than the priority of the previously selected track. By selecting a track with a next higher priority, the task may not execute at a track with a priority lower than the native priority of the task.

If there are no other tracks with a higher priority, then processing may flow to block 522. At block 522, the task may be put into a wait mode. In some embodiment, the wait mode may include a wait time period where the task may wait a predefined amount of time before re-attempting to execute at a track. For example, the task may wait five seconds before re-attempting to execute at a track. In one embodiment, after the wait time period expires, the task may re-attempt to execute at a track with a priority that matches the native priority of the task.

In another embodiment, the wait mode may be a queue of tasks waiting to execute, such as, for example, a first-in-first-out queue. In some embodiments, each of a plurality of wait queues may correspond to a different track. In one such embodiment, the task may be put onto a wait queue that corresponds to a track with a priority that matches the native priority of the task. After expiration of the wait time period and/or exiting the wait queue, process 500 may loop to block 506, where the task may re-attempt to execute at a track with a priority that matches the task native priority.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It Will also be understood that each block of the flowchart illustration, and combinations of blocks in the flowchart illustration, can be implemented by special purpose hardware-based systems, which perform the specified actions or steps, or combinations of special purpose hardware and computer instructions.

Use Case Illustrations

Figure 6:
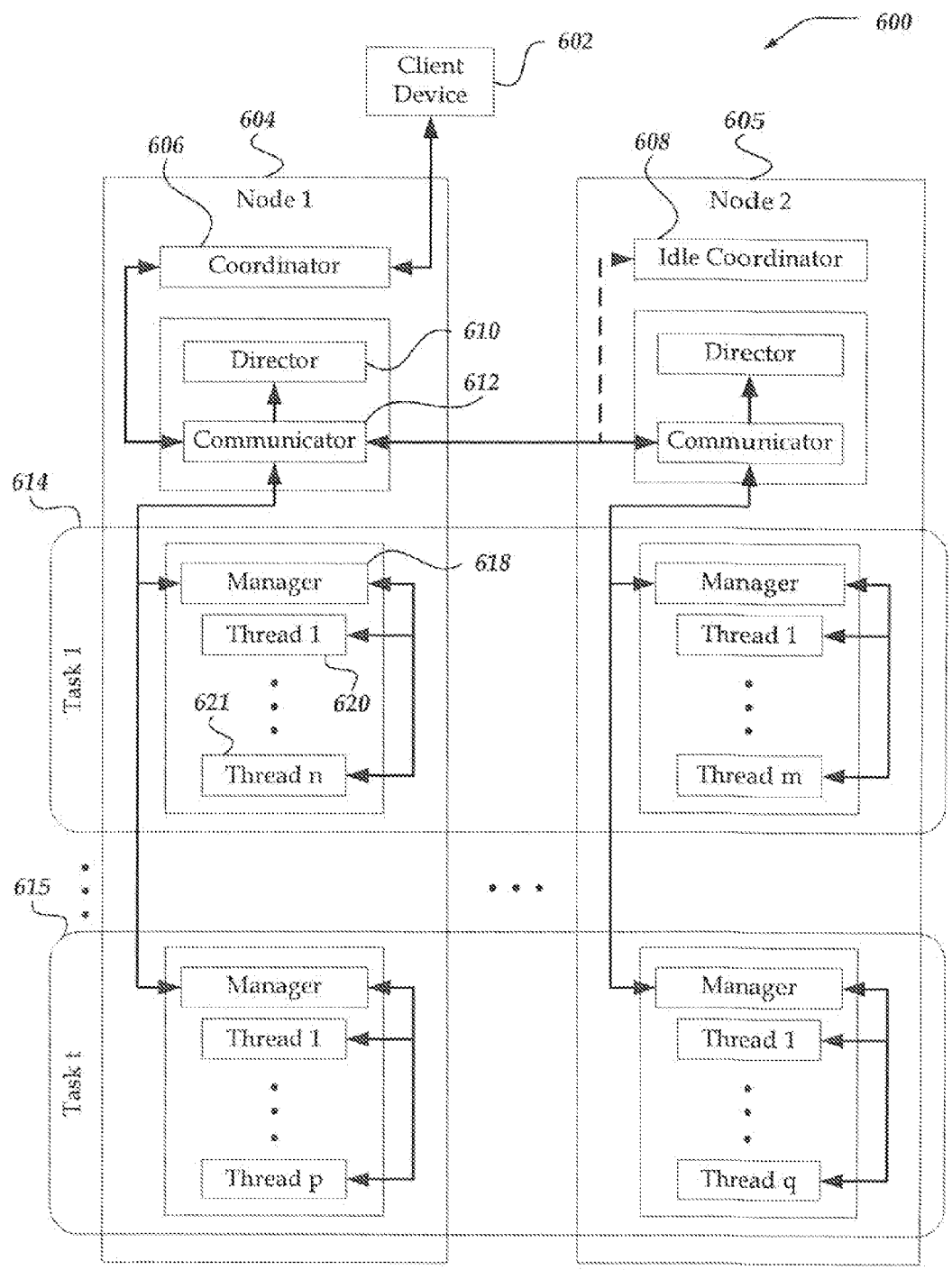
FIG. 6 shows an overview system diagram generally showing one embodiment of a use case illustration of a plurality of tasks distributed across a cluster of nodes.

FIG. 6 shows an overview system diagram generally showing one embodiment of a use case illustration of a plurality of tasks distributed across a cluster of nodes. As shown, system 600 may include client device 602 and nodes 604-605. In one embodiment client device 602 may be an embodiment of client device 200 of FIG. 2. In some embodiments, nodes 604-605 may be members of a cluster of nodes. Although two nodes are illustrated, the invention is not so limited and other numbers of nodes may be employed.

In some embodiments, one node in the cluster may be designated and/or elected to be a coordinator node, while other nodes in the cluster may be support nodes. As shown, node 604 may be the coordinator node and node 605 may be a support node. The coordinator node may include coordinator 606 and the support nodes may include idle coordinator 608. In some embodiments, idle coordinator 608 may include the functionality of coordinator 606. However, idle coordinator 608 may not perform its functions until the corresponding node is elected as the coordinator node, at which time idle coordinator 608 may switch to coordinator 606.

Coordinator 606 may be configured to perform a plurality of coordination operations among nodes 604-605 to manage the cluster of nodes. In one embodiment, coordinator 606 may distribute tasks 614-615 across nodes 604-605, such that at least a portion of a task executes on one or more nodes. Although FIG. 6 illustrates two tasks, the invention is not so limited and other numbers of tasks may be employed. In at least one embodiment, a task may execute on one or more nodes, but may not execute on one or more other nodes. In some embodiments, coordinator 606 may generate and provide a task request to one or more of nodes 604-605. In other embodiments, coordinator 606 may receive task requests from client device 602.

In some other embodiments, coordinator 606 may perform an impact analysis of tasks 614-615 on nodes 604-605. In such an embodiment, coordinator 606 may utilize results of the impact analysis to distribute tasks and/or manage an impact of tasks executing on a node. Coordinator 606 may instruct a director on a node, such as director 610, to initiate tasks, terminate tasks, modify an impact of tasks, or the like.

Each node may include a director, such as director 610, to manage the node. In some embodiments, director 610 may be configured to perform embodiments as described above in conjunction with FIGS. 4 and/or 5. In one embodiment, director 610 may be configured to receive a task execution request from coordinator 606. Director 610 may identify an available track on node 604 to execute the task based on a task native priority and a track priority.

Director 610 may also be configured to provide upper-level management of tasks executing on node 604. The upper-level management may include, but is not limited to, initiating the execution of tasks, terminating the execution of tasks, modifying an impact of tasks, or the like on the node. In some embodiments, director 610 may notify manager 618 to increase and/or decrease a number of threads executing for task 614 on node 604. In other embodiments, director 610 may notify manager 618 to execute a predetermined number of threads. In yet other embodiments, director 610 may notify manager 618 to put task 614 into a wait mode on node 604.

Manager 618 may be configured to manage a task executing on a given node. As such, each task executing on each node may include a manager, such as manager 618. Manager 618 may be configured to manage individual threads 620-621 executing on node 604 for task 614. In one embodiment, manager 618 may be configured to. increase and/or decrease a number of threads (whole and/or fractional threads) executing on node 604. In some embodiments, each manager may operate independent of other managers on the same node and/or different nodes.

In some other embodiments, manager 618 may be configured to take a lock on a file. In one embodiment, manager 618 may attempt to take a lock on a file if task 614 needs access the file. A lock taken by manager 618 may prevent another manager on the same node and/or a different node from accessing the same file until manager 618 releases the lock. In at least one embodiment, the lock taken by manager 618 may be independent of user locks. As a result, user locks may not be impacted by the independent lock taken by manager 618.

Nodes 604-605 may also include a communicator, such as communicator 612. Communicator 612 may be configured to enable communication between coordinator 606, director 610, and managers 618-619. Communicator 612 may also be configured to enable communication between nodes 604-605.

Figure 7:
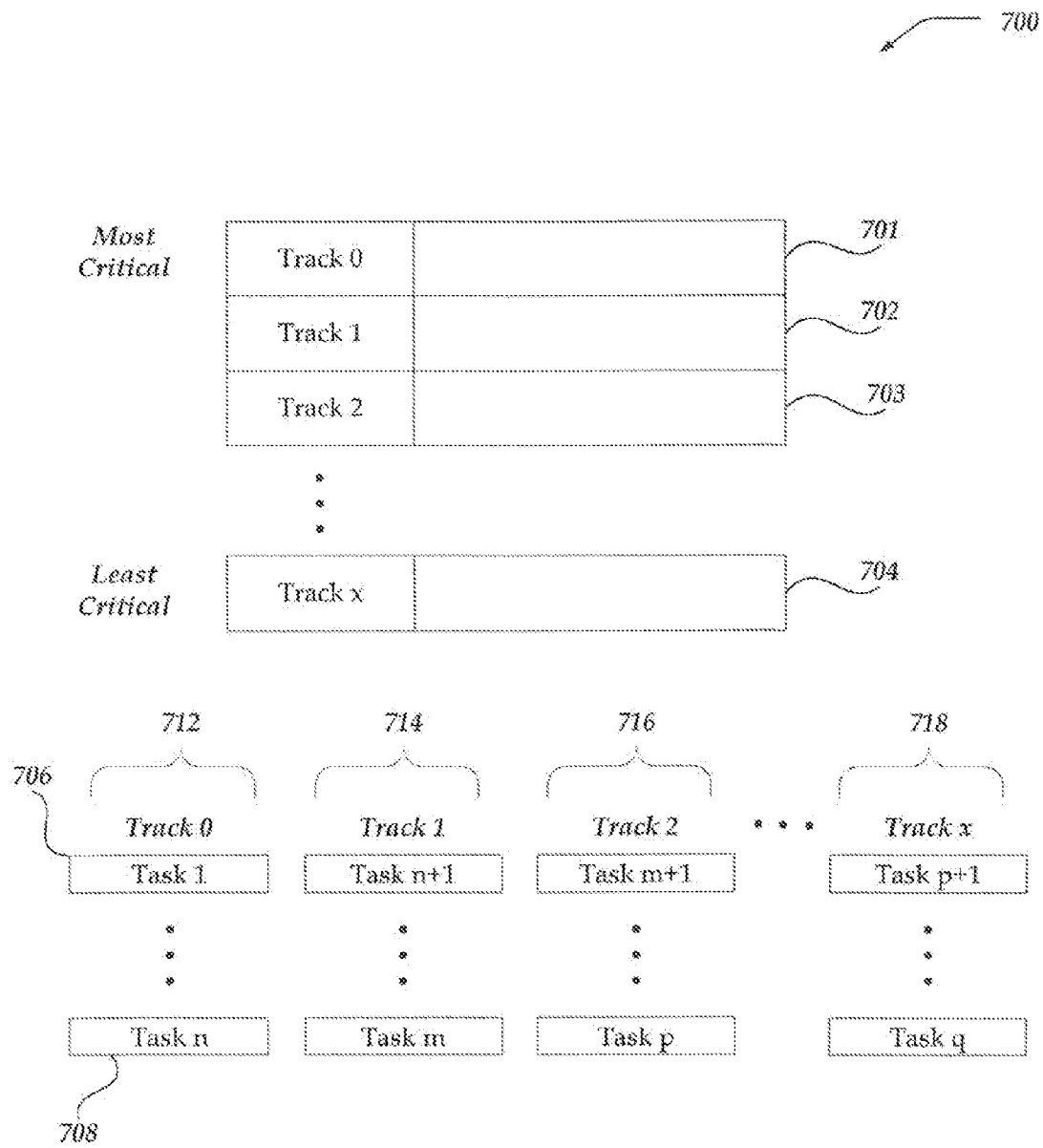
FIG. 7 illustrates a non-exhaustive example of a use case of an embodiment of a plurality of tracks each having a priority and a plurality of tasks having a native priority that matches a priority of a track.

FIG. 7 illustrates a non-exhaustive example of a use case of an embodiment of a plurality of tracks each having a priority and a plurality of tasks having a native priority that corresponds to a track. System 700 may include tracks 701-704, where track 701 has a highest priority for tasks that are the most critical and track 704 has a lowest priority for tasks that are the least critical. In one non-limiting, non-exhaustive example, track 701 may have a priority of zero, track 702 may have a priority of one, track 703 may have a priority of two, and so forth.

Tasks 712 may each include a native track priority that matches a priority of track 701, such as, for example, a native track priority of zero. Tasks 714 may include a native track priority that matches a priority of track 702, such as, for example, a native track priority of one. Tasks 716 may include a native track priority that matches a priority of track 703, such as, for example, a native track priority of two. Tasks 718 may include a native track priority that matches a priority of track 704, such as, for example, a native track priority of x.

In some embodiments, each task native priority may also include a native in-track priority. For example, task 706 may include a native in-track priority of one, which may be higher a native in-track priority of task 708.

Figure 8A:
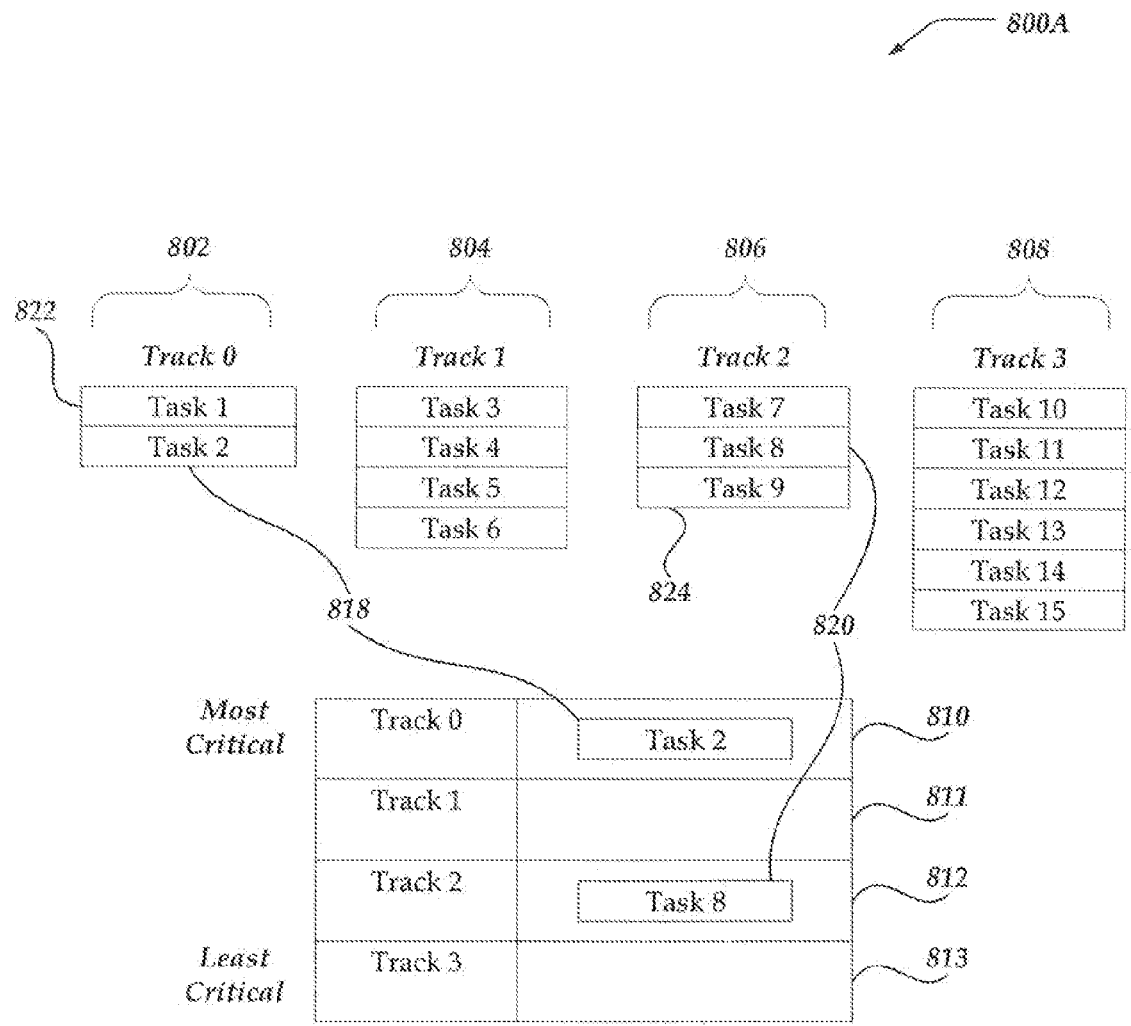
FIGS. 8A-8C illustrate a non-exhaustive example of a use case of an embodiment of executing tasks at an available track based on a native priority of a task and a priority of available tracks.
Figure 8B:
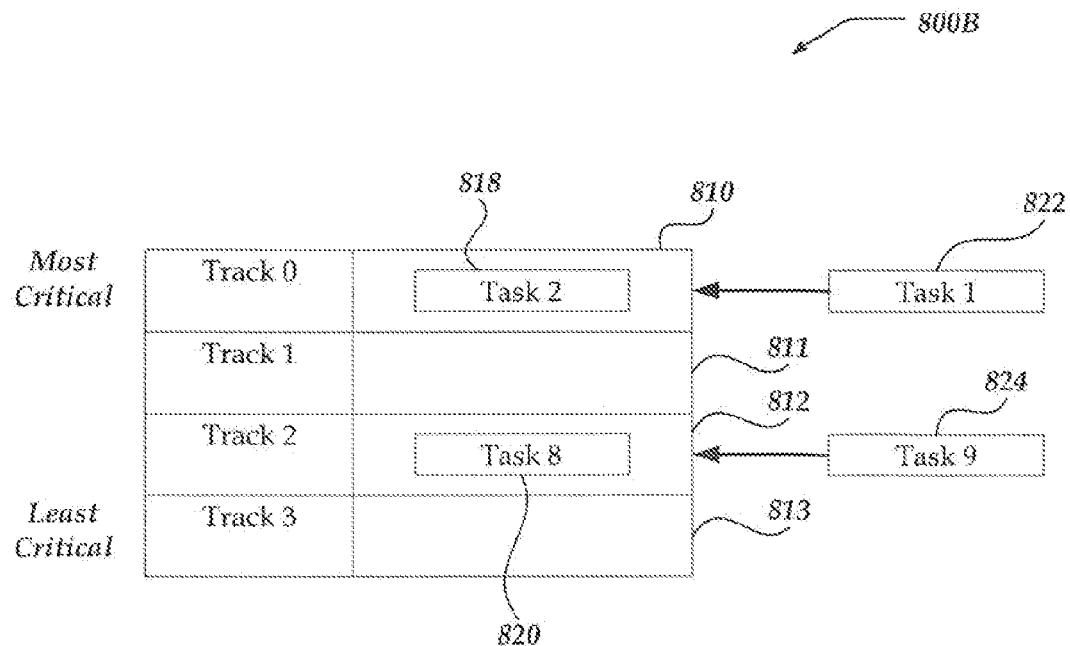
Figure 8C:
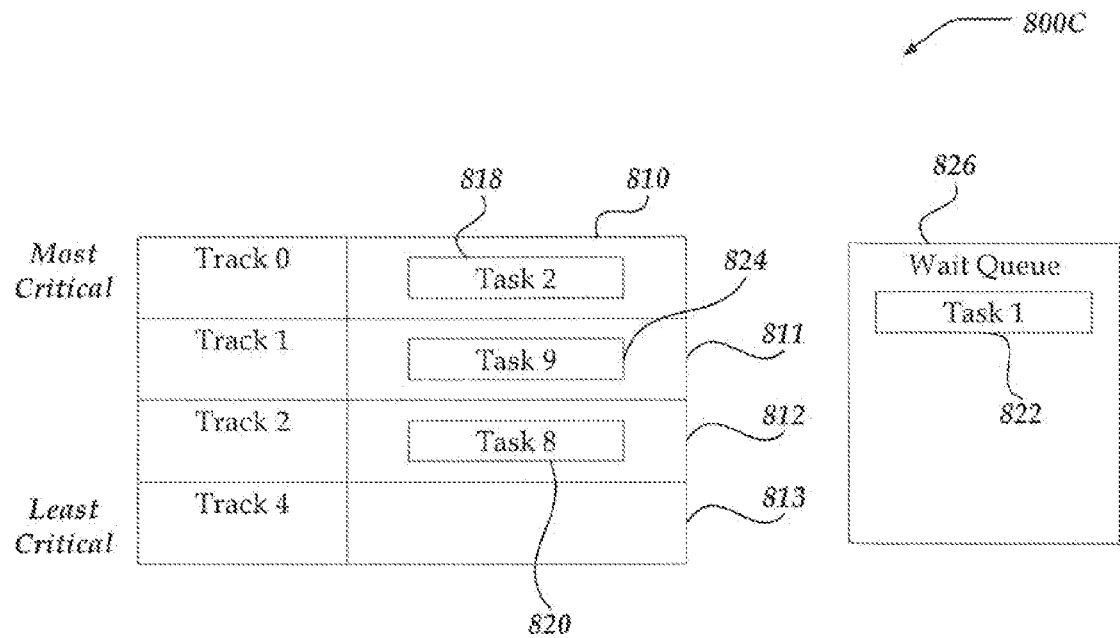

FIGS. 8A-8C illustrate a non-exhaustive example of a use case of an embodiment of executing tasks at an available track based on a native priority of a task and a priority of available tracks. Systems 800A-800C of FIGS. 8A-8C, respectively, may include tracks 810-813, where track 810 has a highest priority for tasks that are the most critical and track 813 has a lowest priority for tasks that are the least critical. In one non-limiting, non-exhaustive example, track 810 may have a priority of zero, track 811 may have a priority of one, track 812 may have a priority of two, and track 813 may have a priority of three.

Tasks 802 may include task 822 and task 818, which may have a native track priority that matches a priority of track 810 (i.e., "Track 0"), such as a native track priority of zero. Tasks 804 may each have a native track priority that matches a priority of track 811 (i.e., "Track 1"), such as a native track priority of one. Tasks 806 may include task 824 and 820, which may have a native track priority that matches a priority of track 812 (i.e., "Track 2"), such as a native track priority of two. Tasks 808 may have a native track priority that matches a priority of track 813 (i.e., "Track 3"), such as a native track priority of three.

Tasks 802 may include task 818 (i.e., "Task 2"), which may have a native track priority of zero. By employing embodiments as described above, task 818 may execute at track 810 because the native track priority of task 818 (i.e., zero) matches the priority of track 810 (i.e., zero). Tasks 806 may include task 820 (i.e., "Task 8"), which may have a native track priority of two. By employing embodiments as described above, task 820 may execute at track 812 because the native track priority of task 820 (i.e., two) matches the priority of track 812 (i.e., two).

Continuing the use case example at FIG. 8B, a request for task 822 may be received. As shown in FIG. 8A, tasks 802 may include task 822 (i.e., "Task 1"), which may have a native track priority of zero. Thus, task 822 may execute at track 810 because the native track priority of task 822 (i.e., zero) matches the priority of track 810 (i.e., zero). However, track 810 is not available because task 818 is currently executing at track 810.

Similarly, a request for task 824 may also be received. As shown in FIG. 8A, tasks 806 may include task 824 (i.e., "Task 8"), which may have a native track priority of two. Thus, task 824 may execute at track 812 because the native track priority of task 820 (i.e., two) matches the priority of track 812 (i.e., two). However, track 812 is not available because task 820 is currently executing at track 810.

FIG. 8C shows one embodiment of a result of employing embodiments as described above to tasks 822 and 824. Since track 810 is unavailable and track 810 is the highest priority track (i.e., there is not a next higher priority track), task 822 may be put into wait queue 826. In some embodiments, wait queue 826 may be a wait queue for tasks that have a native priority that matches the priority of track 810. In such an embodiment, other wait queues (not shown) may be utilized for tasks that have a native priority that mach the priority of the other tracks.

For task 824, since track 812 is unavailable, a next highest priority track may be identified, which is track 811. As shown in FIG. 8B track 811 is available (i.e., no task is currently executing at the track), thus, task 824 may execute at track 824.

In some embodiments (not shown), each task may have a native in-track priority. For example, assume task 822 has a higher native in-track priority than task 818. In such an example, track 810 may be identified as available because the incoming task (i.e., task 822) has a higher native in-track priority than the task currently executing at track 810. As a result, task 818 may be put into wait queue 826 and task 822 may execute at track 810.

In another example, assume task 824 has a lower native in-track priority than task 820. In this example, track 812 may be identified as unavailable because the incoming task (i.e., task 824) has a lower native in-track priority than the task currently executing at track 812. As a result, task 824 may not execute at track 812, but may execute at track 811 for the same reasons as discussed above.

In some other embodiments (not shown), assume a new task request is, received for a task having a native track priority of one (e.g., "Task 3"). In one such embodiment, Task 824 may put into a wait queue and the new task may execute at track 811 because the new task has a native priority (i.e., one) higher than the native priority (i.e., two) of the task currently executing at track 811.

The above specification, examples, and data provide a complete description of the manufacture and use of the composition of the invention. Since many embodiments of the invention can be made without departing from the spirit and scope of the invention, the invention resides in the claims hereinafter appended.

What is claimed is:

1. A method for managing the processing of tasks over a network, comprising:
    establishing an ordered priority for each of a plurality of tracks, wherein each track corresponds to at least one separate resource that is operative to process at least one task;
    providing a request to process a task having a native track priority and a native in-track priority;
    determining a track for executing the provided task based on the native track priority of the task and an ordered priority of the track;
    determining the availability of the track for processing the task based on the native in-track priority of the task;
    in response to determining the track is unavailable for processing the task, iteratively determining another track having a next higher ordered priority until another track is determined to be available to process the task; and
    processing the task at the determined track that is available.

2. The method of claim 1, wherein the native track priority and the native in-track priority of the task are modifiable by a user of a client device.

3. The method of claim 1, wherein the track is unavailable for processing the task if another task that is currently processing at the track has at least one of a higher native track priority than the native track priority of the task or both an equal native track priority as the native track priority of the task and a higher native in-track priority than the native in-track priority of the task.

4. The method of claim 1, further comprising:
    if the track is unavailable for processing the task and the iteratively determined other tracks having higher ordered priority than the native track priority of the task are unavailable for processing the task, putting the task into a wait mode before re-determining track availability.

5. The method of claim 4, wherein the wait mode includes putting the task in a queue.

6. The method of claim 1, further comprising:
    putting another task that has a lower native in-track priority than the native in-track priority of the task that is currently executing at the determined track in a wait mode prior to determining the another track.

7. A network device for managing the processing of tasks over a network, comprising:
    A memory for storing data and instructions;
    A processor that executes the instructions to enable actions, including:
        establishing an ordered priority for each of a plurality of tracks, wherein each track corresponds to at least one separate resource that is operative to process at least one task;
        providing a request to process a task having a native track priority and a native in-track priority;
        determining a track for executing the provided task based on the native track priority of the task and an ordered priority of the track;
        determining the availability of the track for processing the task based on the native in-track priority of the task;
        in response to determining the track is unavailable for processing the task, iteratively determining another track having a next higher ordered priority until another track is determined to be available to process the task; and processing the task at the determined track that is available.

8. The network device of claim 7, wherein the native track priority and the native in-track priority of the task are modifiable by a user of a client device.

9. The network device of claim 7, wherein the track is unavailable for processing the task if another task that is currently processing at the track has at least one of a higher native track priority than the native track priority of the task or both an equal native track priority as the native track priority of the task and a higher native in-track priority than the native in-track priority of the task.

10. The network device of claim 7, wherein the processor further enable actions, comprising:
   if the track is unavailable for processing the task and the iteratively determined other tracks having higher ordered priority than the native track priority of the task are unavailable for processing the task, putting the task into a wait mode before re-determining track availability.

11. The network device of claim 10, wherein the wait mode includes putting the task in a queue.

12. The network device of claim 7, wherein the processor further enable actions, comprising:
   putting another task that has a lower native in-track priority than the native in-track priority of the task that is currently executing at the determined track in a wait mode prior to determining the another track.

13. A processor readable non-transitory storage media that includes instructions for managing the processing of tasks with a network device, wherein the execution of the instructions by a processor enables actions, comprising:
   establishing an ordered priority for each of a plurality of tracks, wherein each track corresponds to at least one separate resource that is operative to process at least one task;
   providing a request to process a task having a native track priority and a native in-track priority;
   determining a track for executing the provided task based on the native track priority of the task and an ordered priority of the track;
   determining the availability of the track for processing the task based on the native in-track priority of the task;
   in response to determining the track is unavailable for processing the task, iteratively determining another track having a next higher ordered priority until another track is determined to be available to process the task; and
   processing the task at the determined track that is available.

14. The media of claim 13, wherein the native track priority and the native in-track priority of the task are modifiable by a user of a client device.

15. The media of claim 13, wherein the track is unavailable for processing the task if another task that is currently processing at the track has at least one of a higher native track priority than the native track priority of the task or both an equal native track priority as the native track priority of the task and a higher native in-track priority than the native in-track priority of the task.

16. The media of claim 13, further comprising:
   if the track is unavailable for processing the task and the iteratively determined other tracks having higher ordered priority than the native track priority of the task are unavailable for processing the task, putting the task into a wait mode before re-determining track availability.

17. The media of claim 16, wherein the wait mode includes putting the task in a queue.

18. The media of claim 13, further comprising:
   putting another task that has a lower native in-track priority than the native in-track priority of the task that is currently executing at the determined track in a wait mode prior to determining the another track.

\* \* \* \* \*